United States Patent
Han et al.

(10) Patent No.: US 10,454,631 B2
(45) Date of Patent: Oct. 22, 2019

(54) METHODS AND APPARATUSES FOR HARQ RETRANSMISSION ON UNLICENSED CARRIER IN LTE-LAA SYSTEM

(71) Applicant: Alcatel Lucent, Boulogne-Billancourt (FR)

(72) Inventors: Feng Han, Shanghai (CN); Teck Hu, Melbourne, FL (US); Shin Horng Wong, Chippenham (GB)

(73) Assignee: Alcatel Lucent, Boulogne Billancourt (FR)

( * ) Notice: Subject to any disclaimer, the term of this patent is extended or adjusted under 35 U.S.C. 154(b) by 0 days.

(21) Appl. No.: 15/514,238

(22) PCT Filed: Sep. 4, 2015

(86) PCT No.: PCT/IB2015/001886
§ 371 (c)(1),
(2) Date: Mar. 24, 2017

(87) PCT Pub. No.: WO2016/046625
PCT Pub. Date: Mar. 31, 2016

(65) Prior Publication Data
US 2017/0279565 A1 Sep. 28, 2017

(30) Foreign Application Priority Data
Sep. 24, 2014 (CN) .......................... 2014 1 0494959

(51) Int. Cl.
*H04L 1/18* (2006.01)
*H04L 27/00* (2006.01)
*H04W 16/14* (2009.01)

(52) U.S. Cl.
CPC .......... *H04L 1/1887* (2013.01); *H04L 1/1812* (2013.01); *H04L 1/1874* (2013.01);
(Continued)

(58) Field of Classification Search
CPC . H04L 1/1877; H04L 24/0006; H04L 1/1874; H04L 1/1887; H04L 1/1812; H04W 16/14
See application file for complete search history.

(56) References Cited

U.S. PATENT DOCUMENTS

2003/0103521 A1    6/2003  Raphaeli et al.
2012/0264468 A1   10/2012  Turtinen et al.
(Continued)

FOREIGN PATENT DOCUMENTS

CN        103188711 A      7/2013
WO        WO-02103943 A1  12/2002

OTHER PUBLICATIONS

International Search Report PCT/ISA/210 for International Application No. PCT/IB2015/001886 dated Sep. 4, 2015.

*Primary Examiner* — Peter P Chau
(74) *Attorney, Agent, or Firm* — Harness, Dickey & Pierce, P.L.C.

(57) ABSTRACT

The present disclosure provides methods and apparatuses for HARQ retransmission on an unlicensed carrier in an LTE-LAA system. A method in the base station includes: performing a CCA detection on the unlicensed carrier to determine energy on the unlicensed carrier and, at the same time, initiating an HARQ discarding timer for the unlicensed carrier, when the base station and a UE operate on the unlicensed carrier; comparing the determined energy with a predetermined CCA threshold; if the determined energy on the unlicensed carrier is not smaller than the CCA threshold until the HARQ discarding timer is expired, giving up the HARQ retransmission on the unlicensed carrier; and if the energy is detected to be smaller than the CCA threshold before the HARQ discarding timer is expired, continuing the HARQ retransmission on the unlicensed carrier.

6 Claims, 6 Drawing Sheets

(52) U.S. Cl.
CPC ........ *H04L 1/1877* (2013.01); *H04L 27/0006* (2013.01); *H04W 16/14* (2013.01)

(56) References Cited

U.S. PATENT DOCUMENTS

| | | |
|---|---|---|
| 2014/0012134 A1 | 1/2014 | Nair et al. |
| 2014/0036853 A1 | 2/2014 | Kim et al. |
| 2014/0036889 A1 | 2/2014 | Kim et al. |
| 2015/0055589 A1* | 2/2015 | Yerramalli ............ H04L 1/1861 370/329 |
| 2015/0289208 A1* | 10/2015 | Liu ....................... H04L 1/1887 370/252 |
| 2015/0327275 A1* | 11/2015 | Kwon ................... H04L 5/0055 370/236 |
| 2015/0365931 A1* | 12/2015 | Ng ........................ H04L 1/1812 370/329 |

\* cited by examiner

METHODS AND APPARATUSES FOR HARQ RETRANSMISSION ON UNLICENSED CARRIER IN LTE-LAA SYSTEM

CROSS-REFERENCE TO RELATED APPLICATIONS

This application is a national phase under 35 U.S.C. § 371 of PCT International Application No. PCT/IB2015/001886 which has an International filing date of Sep. 4, 2015, which claims priority to Chinese Patent No. 201410494959.5, filed Sep. 24, 2014, the entire contents of each of which are hereby incorporated by reference.

FIELD

The present disclosure generally relates to the field of wireless communication, and particularly to methods and apparatuses for method in a Base Station for Hybrid Automatic Repeat Request (HARQ) retransmission on an unlicensed carrier in a Long Term Evolution-Licensed Assisted. Access (LTE-LAA) system.

BACKGROUND

With the increasing traffic demand, cellular operators plan to evaluate the feasibility of using unlicensed spectrum to improve network capacity in LTE Release-13. The first idea of LTE-LAA is to aggregate the unlicensed carriers as a Supplemental Downlink (SDL) by using the Carrier Aggregation (CA) technology, and a primary carrier thereof is located in licensed bands.

Figure 1:
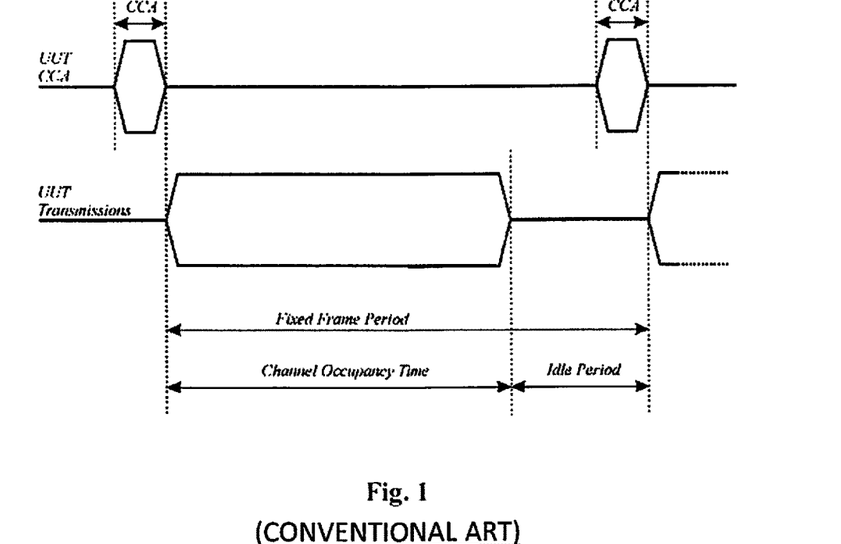
FIG. 1 illustrates the requirements defined by ETSI for frame based equipment.

Different from the exclusive use of licensed spectrum, unlicensed spectrum is shared by multiple Radio Access Technologies (RATs) such as Wi-Fi and Radar system, etc. This makes the LAA transmission opportunistic based on the channel conditions and its own traffic demand. Hence one of the distinct features of LTE-LAA is the non-contiguous and opportunistic use of the unlicensed channel. Particularly, in some areas such as in Europe and Japan, the Listen-Before-Talk (LBT) regulation is required to be followed in order to reduce negative impact on nearby coexisting systems. That is, before data transmission, a Clear Channel Assessment (CCA) check will be performed by using "energy detection" for a duration of a CCA period. If the energy level in the channel is below the CCA threshold, the channel may only be occupied for a Channel Occupancy Time between 1 ms and 10 ms. FIG. 1 illustrates the requirements defined by European Telecommunications Standards Institute (ETSI) for frame based equipment, and the basic parameters are given in the following Table 1.

TABLE 1

Basic Parameters for frame based equipment

| Parameter | Value |
| --- | --- |
| CCA period | >=20 us |
| Channel Occupancy Time | Between 1 and 10 ms |
| Idle Period | >=5% of Occupancy Time |

Figure 2:
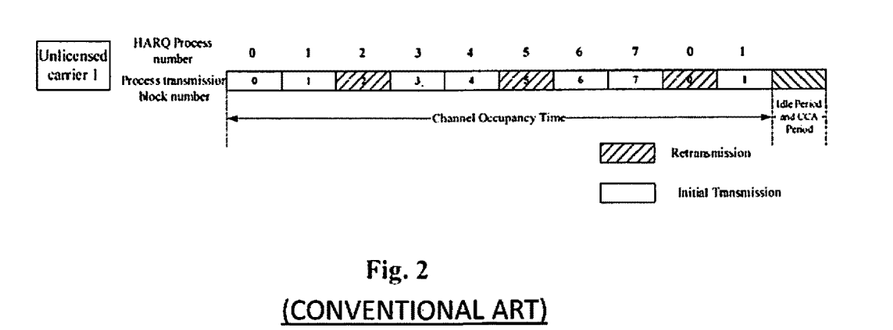
FIG. 2 illustrates an example of an HARQ process on an unlicensed channel.

Hence the short term Channel Occupancy Time (between 1 ms and 10 ms) leads to the discontinuous and intermittent transmission on the unlicensed carriers. FIG. 2 illustrates an example of a Hybrid Automatic Repeat Request (HARQ) process on an unlicensed channel such as unlicensed channel #1. It can be seen from FIG. 2 that the base station has to suspend its transmission after 10 ms Channel Occupancy Time to perform the CCA. However, this feature may cause negative impact on HARQ operation on the unlicensed channel as detailed below.

First, this increases HARQ retransmission latency. The longer the unlicensed channel is detected to be busy, the longer the retransmission latency is incurred. Even if the HARQ retransmission packets are finally transmitted successfully, e.g. after tens of milliseconds, the latency for reassembling operation in Radio Link Control (RLC) layer at the User Equipment (UE) side becomes intolerable. In the worst case, these packets even become useless as the RLC layer has already delivered the received RLC Packet Data Units (PDUs) in the order without the missing PDUs to higher layers or has initiates an Automatic Repeat Request (ARQ) retransmission because the RLC reordering timer (for RLC AM/UM mode) is expired. This obviously wastes radio resources.

Further, as per current 3GPP specification, the New Data Indicator (NDI) included in the downlink assignment is used by the UE to determine whether to clear the soft buffer or not. For LTE-LAA, due to the discontinuous feature and lack of the NDI, the UE doesn't know when and whether to clear the soft buffer. If the soft buffer is cleared earlier than the HARQ retransmissions arriving, the HARQ retransmissions become meaningless. On the contrary, if the soft buffer is kept a little longer whereas the unlicensed channel could not be used for retransmission, it becomes inefficient for the buffer management at the UE side.

Summary

The LBT feature and corresponding challenges for LTE-LAA are new and there is no solution for the above HARQ problems.

In view of above, the present disclosure provides solutions for HARQ retransmission on the unlicensed carrier in the LTE-LAA system.

According to a first aspect of the present disclosure, it is provided a method in a Base Station for HARQ retransmission on an unlicensed carrier in an LTE-LAA system, comprising: performing a CCA detection on the unlicensed carrier to determine energy on the unlicensed carrier and, at the same time, initiating an HARQ discarding timer for the unlicensed carrier, when the base station and a UE operate on the unlicensed carrier; comparing the determined energy with a predetermined CCA threshold; if the determined energy on the unlicensed carrier is not smaller than the CCA threshold until the HARQ discarding timer is expired, giving up the HARQ retransmission on the unlicensed carrier; and if the energy is detected to be smaller than the CCA threshold before the HARQ discarding timer is expired, continuing the HARQ retransmission on the unlicensed carrier.

According to a second aspect of the present disclosure, it is provided a method in a UE for HARQ retransmission on an unlicensed carrier in an LTE-LAA system, comprising: initiating an HARQ discarding timer for the unlicensed carrier upon receipt of an OFF-scheduling command from a Base Station; determining whether the HARQ discarding timer is expired; if the HARQ discarding tinier is expired, clearing soft buffer for both initial transmission and HARQ retransmission on the unlicensed carrier; and if the HARQ discarding timer is not expired, continuing to receive the HARQ retransmission from the Base Station on the unlicensed carrier, and performing soft combination on the received initial transmission and HARQ retransmission after the HARQ retransmission is completed.

According to a third aspect of the present disclosure, it is provided a method in a Base Station for HARQ retransmission on an unlicensed carrier in an LTE-LAA system, comprising: switching the HARQ retransmission on the unlicensed carrier to a primary carrier on a licensed carrier or to another unlicensed carrier when the unlicensed carrier is detected to be busy for a predetermined time period; and transmitting a downlink scheduling assignment message to a User Equipment (UE) on the primary carrier or the another unlicensed carrier, the downlink scheduling assignment message including an HARQ carrier switching indicator for indicating to the UE carrier switching of the HARQ retransmission.

According to a fourth aspect of the present disclosure, it is provided a method in a UE for HARQ retransmission on an unlicensed carrier in an LTE-LAA system, comprising: when receiving a downlink scheduling assignment message from a primary carrier on a licensed carrier or from another unlicensed carrier during transmission with a Base Station on the unlicensed carrier, determining whether the downlink scheduling assignment message includes an HARQ carrier switching indicator for indicating to the UE carrier switching of the HARQ retransmission; and if the downlink scheduling assignment message includes the HARQ carrier switching indicator, switching the HARQ retransmission with the Base Station to the primary carrier or the another unlicensed carrier.

According to a fifth aspect of the present disclosure, it is provided an apparatus in a Base Station for HARQ retransmission on an unlicensed carrier in an LTE-LAA system, comprising: a CCA detection unit configured to perform a CCA detection on the unlicensed carrier to determine energy on the unlicensed carrier and, at the same time, initiate an HARQ discarding timer for the unlicensed carrier, when the base station and a UE operate on the unlicensed carrier; a comparison unit configured to compare the determined energy with a predetermined CCA threshold; and a determination unit configured to give up the HARQ retransmission on the unlicensed carrier if the determined energy on the unlicensed carrier is not smaller than the CCA threshold until the HARQ discarding timer is expired; and to continue the HARQ retransmission on the unlicensed carrier if the energy is detected to be smaller than the CCA threshold before the HARQ discarding timer is expired.

According to a sixth aspect of the present disclosure, it is provided an apparatus in a UE for HARQ retransmission on an unlicensed carrier in an LTE-LAA system, comprising: a timer initiating unit configured to initiate an HARQ discarding timer for the unlicensed carrier upon receipt of an OFF-scheduling command from a Base Station; a determination unit configured to determine whether the HARQ discarding timer is expired; and a processing unit configured to clear soft buffer for both initial transmission and HARQ retransmission on the unlicensed carrier if the HARQ discarding timer is expired; and to continue to receive the HARQ retransmission from the Base Station on the unlicensed carrier if the HARQ discarding tinier is not expired, and to perform soft combination on the received initial transmission and HARQ retransmission after the HARQ retransmission is completed.

According to a seventh aspect of the present disclosure, it is provided an apparatus in a Base Station for HARQ retransmission on an unlicensed carrier in an LTE-LAA system, comprising: a retransmission switching unit configured to switch the HARQ retransmission on the unlicensed carrier to a primary carrier on a licensed carrier or to another unlicensed carrier when the unlicensed carrier is detected to be busy for a predetermined time period; and a transmitting unit configured to transmit a downlink scheduling assignment message to a UE on the primary carrier or the another unlicensed carrier, the downlink scheduling assignment message including an HARQ carrier switching indicator for indicating to the UE carrier switching of the HARQ retransmission.

According to an eighth aspect of the present disclosure, it is provided an apparatus in a UE for HARQ retransmission on an unlicensed carrier in an LTE-LAA system, comprising: a determination unit configured to determine whether a downlink scheduling assignment message includes an HARQ carrier switching indicator for indicating to the UE carrier switching of the HARQ retransmission when receiving the downlink scheduling assignment message from a primary carrier on a licensed carrier or from another unlicensed carrier during transmission with a Base Station on the unlicensed carrier; and a retransmission switching unit configured to switching the HARQ retransmission with the Base Station to the primary carrier or the another unlicensed carrier if the downlink scheduling assignment message includes the HARQ carrier switching indicator.

With the solutions of the present disclosure, different solutions may be selected for different circumstances for HARQ retransmission on unlicensed carriers in an LTE-LAA system, and thus HARQ enhancement is achieved. More particularly, the proposed first embodiment introduces effective inter-operation between the base station and the UE, which facilitates the buffer management and maintenance, and the proposed second embodiment reduces the HARQ latency and improves the system performance via flexible carrier switching.

BRIEF DESCRIPTION OF DRAWINGS

The present disclosure will be understood better and other objectives, details, features and advantages of the present disclosure will become more evident from the description of specific embodiments of the disclosure given in conjunction with the following figures, wherein.

In all of the accompanying drawings, like reference numbers indicate same, like or corresponding features or functions.

DETAILED DESCRIPTION

Preferred embodiments of the present disclosure will now be described in more details in conjunction with accompanying figures. Although preferred embodiments of the present disclosure are shown in the accompanying figures, it should be understood that the present disclosure can be embodied in various ways but not be limited to the embodiments depicted herein. Instead, the embodiments are provided herein to make the disclosure more throughout and complete and convey the scope of the present disclosure to those skilled in this art.

Taking the opportunistic and intermittent use of unlicensed carriers, two embodiments are provided to address the problem of HARQ retransmission on an unlicensed carrier in the LTE-LAA system.

Figure 3:
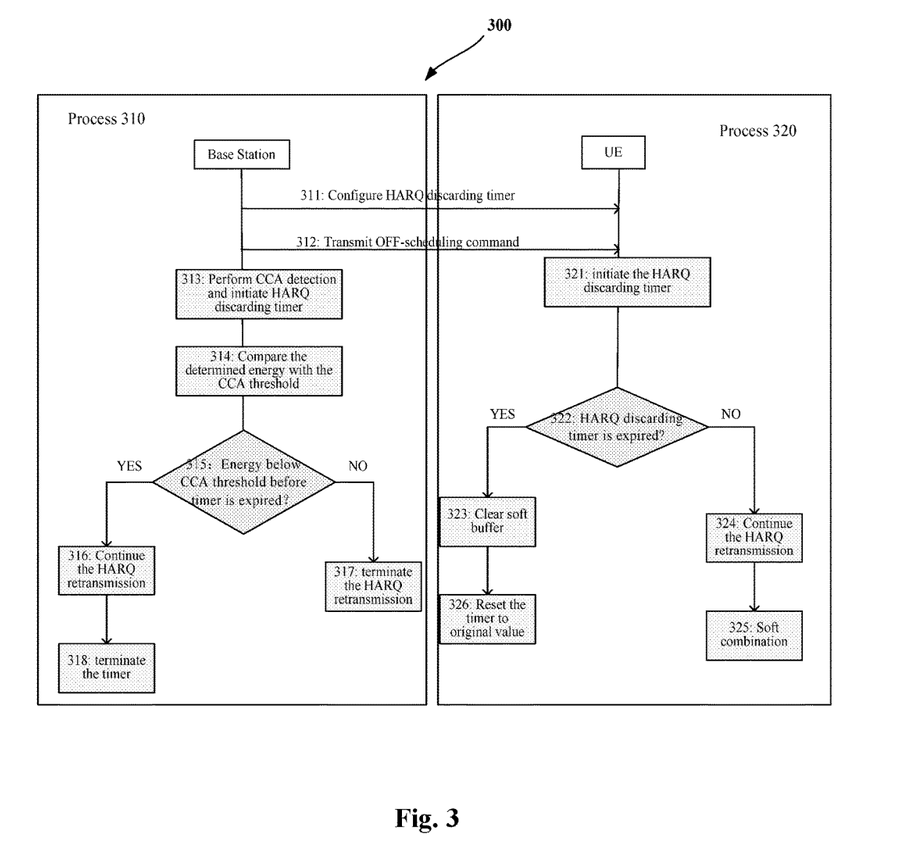
FIG. 3 illustrates a schematic diagram of a method for HARQ retransmission on an unlicensed carrier in a LTE-LAA system according to a first embodiment of the present disclosure.

FIG. 3 illustrates a method 300 for HARQ retransmission on an unlicensed carrier in a LTE-LAA system according to a first embodiment of the present disclosure. As shown in FIG. 3, the method 300 includes both a process 310 at the base station side and a process 320 at the UE side, in which the interactive process between the base station and the UE is included.

As shown in FIG. 3, the process 310 of the method 300 includes a step 311, where the base station configures an HARQ discarding timer for the unlicensed carrier and configures it to the UE. When the base station and the UE operate on the unlicensed carrier, they maintain the same HARQ discarding timer.

Preferably, the HARQ discarding timer maybe configured by the base station via higher layer signaling such as a Radio Resource Control (RRC) connection reconfiguration message, even L1 signaling, based on channel conditions.

More preferably, if the unlicensed carrier is busy, the base station may configure an HARQ discarding timer with a larger expiration time for the unlicensed carrier, while if the unlicensed carrier has a low activity, the base station may configure an HARQ discarding timer with a smaller expiration time for the unlicensed carrier.

Herein, the description is made by taking the case that the base station configures an HARQ discarding timer for the object unlicensed carrier to the UE as an example. However, those skilled in the art may appreciate that the present disclosure is not limited to this. Instead, the HARQ discarding timer may be configured statically, semi-statically or dynamically in any appropriate manner. For example, the HARQ discarding timer may be configured by a higher layer network element.

Next at step 313, when the base station and the UE operate on the unlicensed carrier, the base station performs a CCA detection on the unlicensed carrier to determine the energy on the unlicensed carrier. At the same time, the base station initiates the HARQ discarding timer for the unlicensed carrier.

A step 312 may be included before the step 313, where the base station transmits an OFF-scheduling command to the UE for instructing the UE to initiate the HARQ discarding timer.

At step 314, the base station compares the energy on the unlicensed carrier determined at the step 343 with a predetermined CCA threshold.

At step 315, the base station determines whether there is an energy below the predetermined CCA threshold on the unlicensed carrier before the HARQ discarding timer is expired.

If the determination at step 315 is YES, that is, an energy below the predetermined CCA threshold is detected before the HARQ discarding timer is expired, the base station determines to continue the HARQ retransmission on the unlicensed carrier at step 315. Such an HARQ retransmission is continued according to regional regulations until next idle period. The idle period, as shown in FIG. 1 and Table 1, equals to at least 5% of the Channel Occupancy Time.

On the contrary, if the determination at step 315 is NO, that is, the determined energy on the unlicensed carrier is not smaller than the CCA threshold until the HARQ discarding timer is expired, the base station determines to terminate the HARQ retransmission on the unlicensed carrier at step 317.

Preferably, in this embodiment, expiration time of the HARQ discarding timer is configured to be smaller than that of a Radio Link Control (RLC) reordering timer (for RLC Acknowledged Mode (AM) and Unacknowledged Mode (UM)) so that reordering operation of the PDUs may be efficiently performed at the RLC layer.

As shown in FIG. 3, the process 320 of the method 300 includes the step 311 where the UE received configuration of the HARQ discarding timer from the base station and the step 312 where the UE receives the OFF-scheduling command from the base station.

Next at step 321, when the UE receives the OFF-scheduling command, it initiates the HARQ discarding timer configured by the base station for the unlicensed carrier.

Next at step 322, the UE determines whether the HARQ discarding timer is expired.

If the determination at step 322 is YES, then at step 323, the UE clears soft buffer for both initial transmission and HARQ retransmission on the unlicensed carrier, rather than soft combining them.

After the soft buffer is cleared, the UE may further reset the HARQ discarding timer to its original value (step 326).

On the contrary, if the determination at step 322 is NO, then at step 324, the UE continues to receive the HARQ retransmission from the base station on the unlicensed carrier, and after the HARQ retransmission is completed, at step 325, the UE performs soft combination on the received initial transmission and HARQ retransmission.

Thereafter, the next repeat period may be initiated for the HARQ discarding timer.

Figure 4:
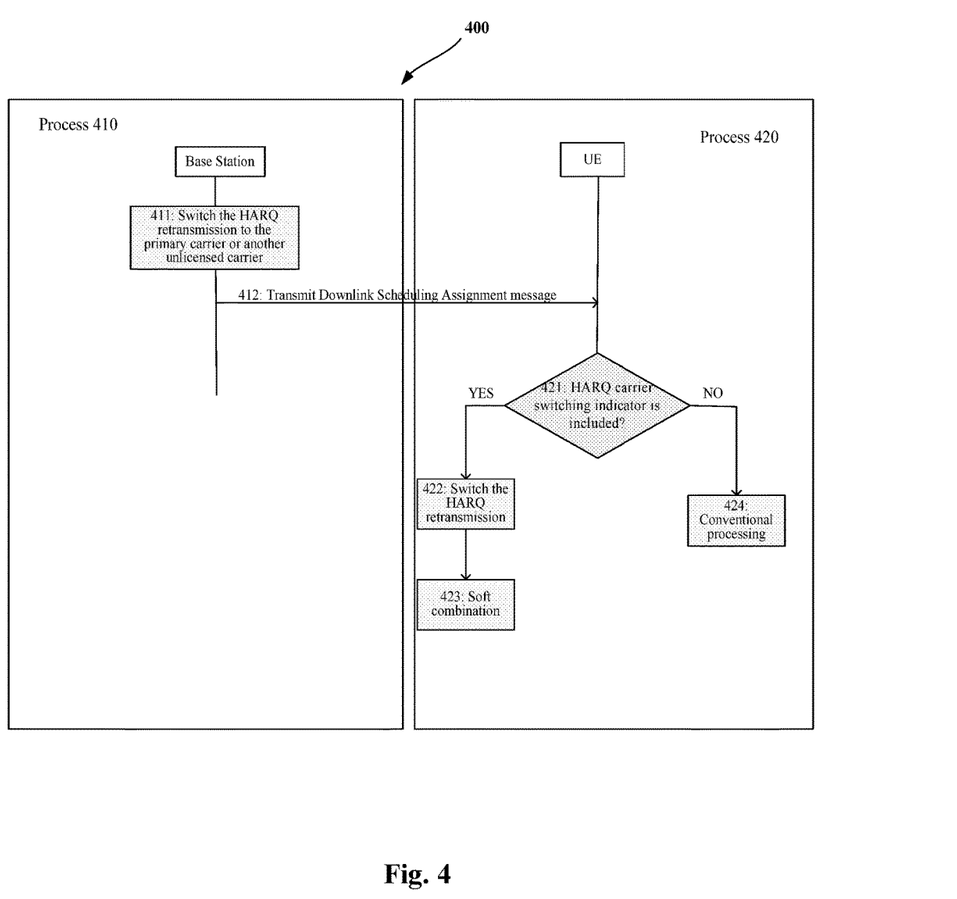
FIG. 4 illustrates a schematic diagram of a method for HARQ retransmission on an unlicensed carrier in a LTE-LAA system according to a second embodiment of the present disclosure.

FIG. 4 illustrates a method 300 for HARQ retransmission on an unlicensed carrier in a LTE-LAA system according to a second embodiment of the present disclosure. As shown in FIG. 4, the method 400 also includes both a process 410 at the base station side and a process 420 at the UE side, in which the interactive process between the base station and the UE is included.

As shown in FIG. 4, the process 410 of the method 400 includes a step 411, where when the base station detects that the unlicensed carrier is busy for a predetermined time period, it switches the HARQ retransmission on the unlicensed carrier to a primary carrier on a licensed carrier or to another unlicensed carrier.

Herein, the detection of the base station may be performed during the idle period.

Thereafter, the base station explicitly indicates carrier switching for the HARQ retransmission to the UE.

In particular, at step 412, the base station transmits a Downlink Scheduling Assignment message including an HARQ carrier switching indicator to the UE for indicating to the UE carrier switching of the HARQ retransmission over the primary carrier or the another unlicensed carrier to which the HARQ retransmission is switched.

In addition to the HARQ carrier switching indicator, the Downlink Scheduling Assignment message further includes identifier of the primary carrier or the another unlicensed carrier and the HARQ process number.

In one implementation, an additional indicator other than those for cross-carrier scheduling is used as the HARQ carrier switching indicator.

As known by those skilled in the art, the conventional Downlink Scheduling Assignment message for cross-carrier scheduling includes two carrier indicators, one for indicating the current carrier which becomes unavailable and the other for indicating the carrier to be switched to, each of which may use 3 bits, for example.

In this embodiment according to the present disclosure, two carriers are still needed, one for indicating the current carrier which becomes unavailable and the other for indicating the carrier to be switched to. The difference lies in that the later should be different from those used in the conventional Downlink Scheduling Assignment message so as to distinguish the HARQ carrier switching of the present disclosure from the conventional cross-carrier scheduling. For example, 111 may be used as the HARQ carrier switching indicator.

Preferably, in this embodiment, the predetermined time period is configured to be smaller than the expiration time of the RLC reordering timer. Furthermore, the predetermined time period may be implementation specific and may be different for different implementations.

As shown in FIG. 4, the process 420 of the method 400 includes the step 412 where the UE receives the downlink scheduling assignment message from the primary carrier on the licensed carrier or another unlicensed carrier during transmission between the UE and the base station on the unlicensed carrier.

At step 421, the UE determines whether the downlink scheduling assignment message includes an HARQ carrier switching indicator for indicating to the UE carrier switching of the HARQ retransmission.

If the result of step 421 is YES, then at step 422, the UE switches the HARQ retransmission with the base station to the primary carrier or the another unlicensed carrier. Furthermore, after the HARQ retransmission is completed, the UE performs soft combination on initial transmission and retransmission from the unlicensed carrier and the HARQ retransmission from the primary carrier or the another unlicensed carrier based on the HARQ carrier switching indicator.

If the result of step 422 is NO, that is, the downlink scheduling assignment message does not indicator HARQ carrier switching, a conventional downlink scheduling assignment process is performed (step 424).

Figure 5:
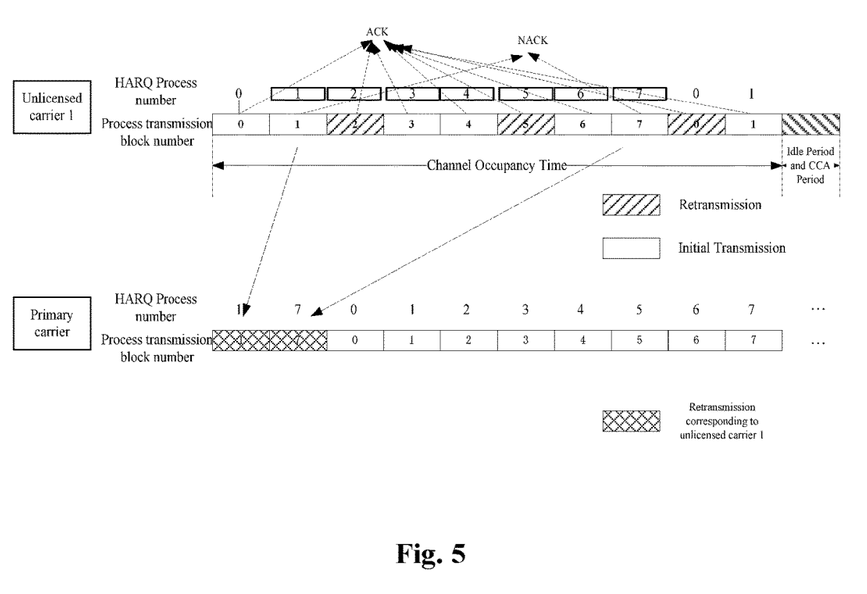
FIG. 5 illustrates an example of HARQ carrier switching of the embodiment of FIG. 4.

FIG. 5 illustrates an example of HARQ carrier switching of the embodiment of FIG. 4. FIG. 5 is illustrated by taking the case that the base station switches the HARQ retransmission to the primary carrier as an example.

As shown in FIG. 5, during the transmission between the base station and the UE on the unlicensed carrier such as the unlicensed carrier 1, negative acknowledgements (NACKs) for the process 1 and process 7 are received on the unlicensed carrier, therefore the HARQ retransmission for the process 1 and the process 7 is scheduled to the primary carrier and the HARQ carrier switching indicator for it is included in the downlink scheduling assignment message. After the HARQ retransmission is completed, the UE may perform soft combination on the newly received retransmission from the primary carrier and the initial transmission/retransmission from the unlicensed carrier 1 which has becomes not appropriate for use.

Two embodiments for HARQ retransmission on the unlicensed carrier in the LTE-LAA system have been described above in connection with the figures. The two embodiments may be selected by the base station according to different circumstances. Generally saying, the first embodiment may be used for the circumstance that the licensed carrier is busy and thus is difficult to switch, and the second embodiment may be used for the circumstance that the licensed carrier is not too busy.

Furthermore, the two embodiments may be used in combination. For example, in the first embodiment, if the base station detects that the unlicensed carrier becomes not appropriate for transmission before the HARQ discarding timer is expired, the base station may switch the HARQ retransmission on the unlicensed carrier to the primary carrier on the licensed carrier or to another unlicensed carrier and inform this to the UE to perform carrier switching. If the UE received HARQ retransmission corresponding to the unavailable unlicensed carrier from the primary carrier or another unlicensed carrier, the UE may determine that an HARQ carrier switching appears at the base station and then terminate the HARQ discarding timer and turn to the second embodiment.

Figure 6:
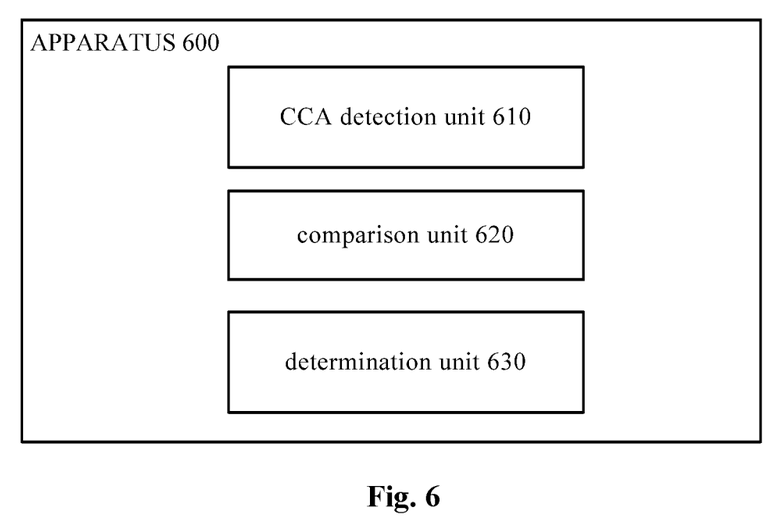
FIG. 6 illustrates a schematic diagram of an apparatus in the base station for HARQ retransmission on an unlicensed carrier in a LTE-LAA system according to a first embodiment of the present disclosure.

FIG. 6 illustrates a schematic diagram of an apparatus 600 for HARQ retransmission on an unlicensed carrier in a LTE-LAA system according to a first embodiment of the present disclosure. The apparatus 600 may be implemented in or by the base station, for example.

As shown in FIG. 6, the apparatus 600 includes a CCA detection unit 610 configured to perform a CCA detection on the unlicensed carrier to determine energy on the unlicensed carrier and, at the same time, initiate an HARQ discarding tinier for the unlicensed carrier, when the base station and a UE operate on the unlicensed carrier; a comparison unit 620 configured to compare the determined energy with a predetermined CCA threshold; and a determination unit 630 configured to give up the HARQ retransmission on the unlicensed carrier if the determined energy on the unlicensed carrier is not smaller than the CCA threshold until the HARQ discarding timer is expired; and to continue the HARQ retransmission on the unlicensed carrier if the energy is detected to be smaller than the CCA threshold before the HARQ discarding timer is expired.

In one implementation, the expiration time of the HARQ discarding timer is configured to be smaller than that of a RLC reordering timer.

In one implementation, the apparatus 600 further comprises an informing unit 640 configured to configure the HARQ discarding timer to the UE via higher layer signaling.

In one implementation, if the unlicensed carrier is busy, the HARQ discarding timer with a larger expiration time is configured for the unlicensed carrier, and if the unlicensed carrier has a low activity, the HARQ discarding tinier with a smaller expiration time is configured for the unlicensed carrier.

In one implementation, the apparatus 600 further comprises a termination unit 650 configured to terminate the HARQ discarding timer if the HARQ retransmission is continued on the unlicensed carrier.

In one implementation, the apparatus 600 further comprises a retransmission carrier switching unit 660 configured to switch the HARQ retransmission to a primary carrier or another unlicensed carrier and inform the UE if the unlicensed carrier is detected to be not suitable for transmission before the HARQ discarding timer is expired.

Figure 7:
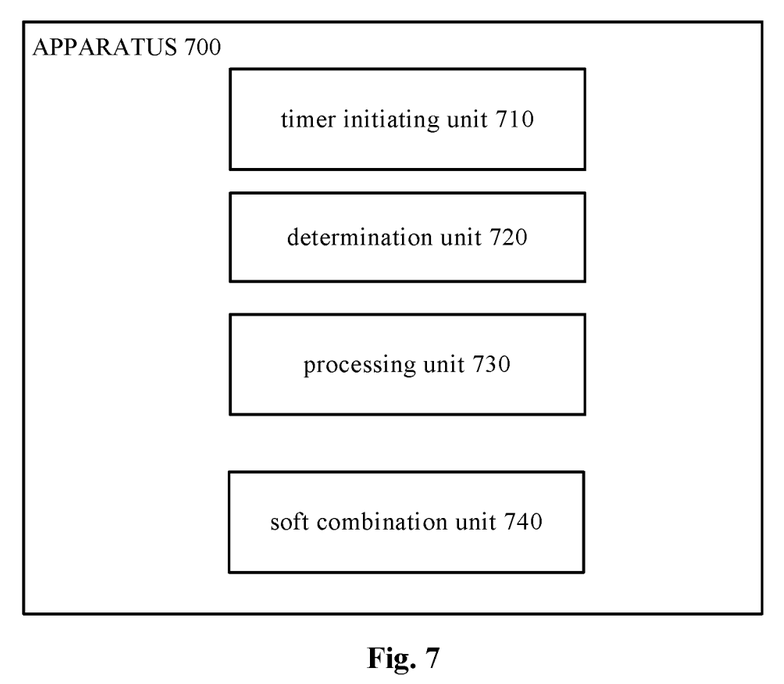
FIG. 7 illustrates a schematic diagram of an apparatus in the UE for HARQ retransmission on an unlicensed carrier in a LTE-LAA system according to a first embodiment of the present disclosure.

FIG. 7 illustrates a schematic diagram of an apparatus 700 for HARQ retransmission on an unlicensed carrier in a LTE-LAA system according to a first embodiment of the present disclosure. The apparatus 700 may be implemented in or by the UE, for example.

As shown in FIG. 7, the apparatus 700 includes a tinier initiating unit 710 configured to initiate an HARQ discarding timer for the unlicensed carrier upon receipt of an OFF-scheduling command from a Base Station; a determination unit 720 configured to determine whether the HARQ discarding timer is expired; and a processing unit 730 configured to clear soft buffer for both initial transmission and HARQ retransmission on the unlicensed carrier if the HARQ discarding timer is expired, and to continue to receive the HARQ retransmission from the Base Station on the unlicensed carrier if the HARQ discarding timer is not expired; and a soft combination unit 740 configured to perform soft combination on the received initial transmission and HARQ retransmission after the HARQ retransmission is completed.

In one implementation, the apparatus 700 further includes a resetting unit 750 configured to restore the HARQ discarding timer to its original value after clearing the soft buffer.

Figure 8:
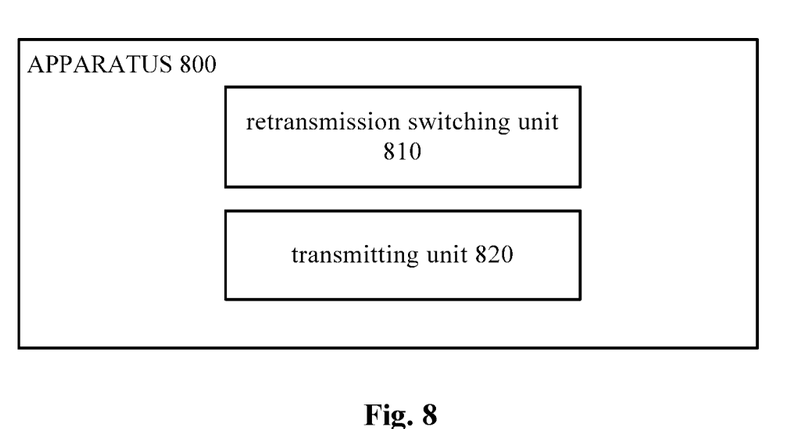
FIG. 8 illustrates a schematic diagram of an apparatus in the base station for HARQ retransmission on an unlicensed carrier in a LTE-LAA system according to a second embodiment of the present disclosure.

FIG. 8 illustrates a schematic diagram of an apparatus 800 for HARQ retransmission on an unlicensed carrier in a LTE-LAA system according to a second embodiment of the present disclosure. The apparatus 800 may be implemented in or by the UE, for example.

As shown in FIG. 8, the apparatus 800 includes a retransmission switching unit 810 configured to switch the HARQ retransmission on the unlicensed carrier to a primary carrier on a licensed carrier or to another unlicensed carrier when the unlicensed carrier is detected to be busy for a predetermined time period; and a transmitting unit 820 configured to transmit a downlink scheduling assignment message to a UE on the primary carrier or the another unlicensed carrier, the downlink scheduling assignment message including an HARQ carrier switching indicator for indicating to the UE carrier switching of the HARQ retransmission.

In one implementation, the downlink scheduling assignment message further includes an identifier of the primary carrier or the another unlicensed carrier and an HARQ process number.

In one implementation, an additional indicator other than those for cross-carrier scheduling is used as the HARQ carrier switching indicator.

In one implementation, the predetermined time period is smaller than expiration time of a RLC reordering timer.

Figure 9:
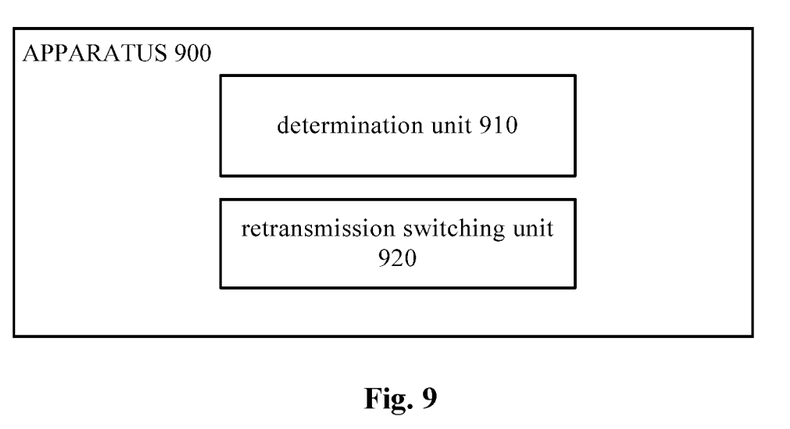
FIG. 9 illustrates a schematic diagram of an apparatus in the UE for HARQ retransmission on an unlicensed carrier in a LTE-LAA system according to a second embodiment of the present disclosure.

FIG. 9 illustrates a schematic diagram of an apparatus 900 for HARQ retransmission on an unlicensed carrier in a LTE-LAA system according to a second embodiment of the present disclosure. The apparatus 900 may be implemented in or by the UE, for example.

As shown in FIG. 9, the apparatus 900 includes a determination unit 910 configured to determine whether a downlink scheduling assignment message includes an HARQ carrier switching indicator for indicating to the UE carrier switching of the HARQ retransmission when receiving the downlink scheduling assignment message from a primary carrier on a licensed carrier or from another unlicensed carrier during transmission with a Base Station on the unlicensed carrier; and a retransmission switching unit 920 configured to switching the HARQ retransmission with the Base Station to the primary carrier or the another unlicensed carrier if the downlink scheduling assignment message includes the HARQ carrier switching indicator.

In one implementation, the downlink scheduling assignment message further includes an identifier of the primary carrier or the another unlicensed carrier and an HARQ process number.

In one implementation, the apparatus 900 further comprises a soft combination unit 930 configured to perform soft combination on initial transmission and retransmission from the unlicensed carrier and the HARQ retransmission from the primary carrier or the another unlicensed carrier based on the HARQ carrier switching indicator after the HARQ retransmission is completed.

Two efficient HARQ enhancement mechanisms are provided as above in consideration of the opportunistic and intermittent use of unlicensed carriers, and the benefits are as follows:

The proposed first embodiment introduces effective inter-operation between the base station and the UE, which facilitates the buffer management and maintenance.

The proposed second embodiment reduces the HARQ latency and improves the system performance via flexible carrier switching.

The methods and apparatuses of the present disclosure have been described with reference to accompanying figures. It is understood by those skilled in this art that any specific order of steps illustrated in the accompanying figures and described in the description is only illustrative in that the method steps and/or actions can be performed in other orders other than the specific order of steps illustrated in the accompanying figures and described in the description while remaining within the scope of the present disclosure.

In one or more exemplary designs, the functions of the present application may be implemented using hardware, software, firmware, or any combinations thereof. In the case of implementation with software, the functions may be stored on a computer readable medium as one or more instructions or codes, or transmitted as one or more instructions or codes on the computer readable medium. The computer readable medium comprises a computer storage medium and a communication medium. The communication medium includes any medium that facilitates transmission of the computer program from one place to another. The storage medium may be any available medium accessible to a general or specific computer. The computer-readable medium may include, for example, but not limited to, RAM, ROM, EEPROM, CD-ROM or other optical disc storage devices, magnetic disk storage devices, or other magnetic storage devices, or any other medium that carries or stores desired program code means in a manner of instructions or data structures accessible by a general or specific computer or a general or specific processor. Furthermore, any connection may also be considered as a computer-readable medium. For example, if software is transmitted from a website, server or other remote source using a co-axial cable, an optical cable, a twisted pair wire, a digital subscriber line (DSL), or radio technologies such as infrared, radio or microwave, then the co-axial cable, optical cable, twisted pair wire, digital subscriber line (DSL), or radio technologies such as infrared, radio or microwave are also covered by the definition of medium.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any normal processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The above depiction of the present disclosure is to enable any of those skilled in the art to implement or use the present disclosure. For those skilled in the art, various modifications of the present disclosure are obvious, and the general principle defined herein may also be applied to other transformations without departing from the spirit and protection scope of the present disclosure. Thus, the present disclosure is not limited to the examples and designs as described herein, but should be consistent with the broadest scope of the principle and novel characteristics of the present disclosure.

The invention claimed is:

1. A method in a Base Station for Hybrid Automatic Repeat Request (HARQ) retransmission on an unlicensed carrier in a Long Term Evolution-Licensed Assisted Access (LTE-LAA) system, comprising:
    performing a Clear Channel Assessment (CCA) detection on the unlicensed carrier to determine energy on the unlicensed carrier and, at the same time, initiating an HARQ discarding timer for the unlicensed carrier, when the base station and a User Equipment (UE) operate on the unlicensed carrier;
    comparing the determined energy with a predetermined CCA threshold;
    if the determined energy on the unlicensed carrier is not smaller than the CCA threshold until the HARQ discarding timer is expired, giving up the HARQ retransmission on the unlicensed carrier; and
    if the determined energy is detected to be smaller than the CCA threshold before the HARQ discarding timer is expired, continuing the HARQ retransmission on the unlicensed carrier.

2. The method according to claim 1, wherein expiration time of the HARQ discarding timer is configured to be smaller than that of a Radio Link Control (RLC) reordering timer.

3. The method according to claim 1, further comprising:
    configuring the HARQ discarding timer to the UE via higher layer signaling.

4. The method according to claim 3, wherein if the unlicensed carrier is busy, the HARQ discarding timer with a first expiration time is configured for the unlicensed carrier, and if the unlicensed carrier is not busy, the HARQ discarding timer with a second expiration time is configured for the unlicensed carrier, the second expiration time being less than the first expiration time.

5. The method according to claim 1, further comprising:
    terminating the HARQ discarding timer if the HARQ retransmission is continued on the unlicensed carrier.

6. The method according to claim 1, further comprising:
    switching the HARQ retransmission to a primary carrier or another unlicensed carrier and informing the UE if the unlicensed carrier is detected to be not suitable for transmission before the HARQ discarding timer is expired.

* * * * *